United States Patent
Arunachalam et al.

(10) Patent No.: US 10,341,167 B2
(45) Date of Patent: Jul. 2, 2019

(54) ELECTRONIC VOLUME CORRECTOR WITH CLOUD ENABLED HEALTH MONITORING OF ASSOCIATED GAS DISTRIBUTION EQUIPMENT

(71) Applicant: Honeywell International Inc., Morris Plains, NJ (US)

(72) Inventors: Soundari Arunachalam, Karnataka (IN); Dinesh Kumar K N, Karnataka (IN); Suresh Kumar Palle, Karnataka (IN); Pierre Dufour, Cincinnati, OH (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 141 days.

(21) Appl. No.: 15/673,795

(22) Filed: Aug. 10, 2017

(65) Prior Publication Data
US 2019/0052515 A1 Feb. 14, 2019

(51) Int. Cl.
| | |
|---|---|
| *H04L 12/24* | (2006.01) |
| *G06Q 10/00* | (2012.01) |
| *G06Q 50/06* | (2012.01) |
| *H04W 4/70* | (2018.01) |
| *H04L 29/08* | (2006.01) |

(52) U.S. Cl.
CPC ......... *H04L 41/0631* (2013.01); *G06Q 10/20* (2013.01); *G06Q 50/06* (2013.01); *H04W 4/70* (2018.02); *H04L 41/069* (2013.01); *H04L 67/10* (2013.01)

(58) Field of Classification Search
CPC ... H04L 41/0631; H04L 41/069; H04L 67/10; H04W 4/70; G06Q 10/20; G06Q 50/06
See application file for complete search history.

(56) References Cited

U.S. PATENT DOCUMENTS

| | | | |
|---|---|---|---|
| 4,910,519 A | 3/1990 | Duell et al. | |
| 7,326,931 B2 | 2/2008 | Frodl et al. | |
| 7,860,677 B2 * | 12/2010 | Artiuch | G01F 1/05 702/100 |
| 9,030,329 B2 * | 5/2015 | Rutherford | G08B 21/16 340/632 |
| 2007/0222636 A1 | 9/2007 | Iwamura | |
| 2008/0117066 A1 | 5/2008 | Kononov et al. | |
| 2013/0185000 A1 | 7/2013 | Fabes et al. | |

* cited by examiner

*Primary Examiner* — Arvin Eskandarnia
(74) *Attorney, Agent, or Firm* — Loza & Loza LLP; Luis M. Ortiz; Kermit D. Lopez

(57) ABSTRACT

A system and method for distributed error detection in gas distribution systems comprises sensors coupled to a metering device, and configured to collect sensor information indicative of an operation of the metering device. An electronic volume corrector associated with the metering device serves as a gateway for transmission of sensor information indicative of the operation of the metering device. A computer system is configured to receive sensor information indicative of an operation of the metering device provided by an electronic volume corrector, identify parameters indicative of deviations from the intended operation of the metering device, perform pattern comparisons of the sensor information with reference information, and provide a performance indication of the metering device.

20 Claims, 7 Drawing Sheets

ELECTRONIC VOLUME CORRECTOR WITH CLOUD ENABLED HEALTH MONITORING OF ASSOCIATED GAS DISTRIBUTION EQUIPMENT

TECHNICAL FIELD

The present embodiments are generally related to gas distribution systems. The embodiments are related to methods and systems for monitoring gas distribution systems. The embodiments are additionally related to methods and systems for volume corrector equipment. More specifically, the embodiments are related to methods and systems of using a volume corrector for cloud based health monitoring of gas distribution equipment

BACKGROUND

Several millions of dollars are lost every year as a result of Lost-and-unaccounted-for-gas ("LAUF"). LAUF is determined by calculating the difference between the amount of gas purchased by a purchaser and the amount of gas sold. LAUF represents a major source of overhead in the gas distribution business, and this is true across geographies.

LAUF has several causes including unauthorized consumption, faulty equipment (including meters and volume correctors), storage and withdrawal adjustments, billing errors (particularly wherever manual billing is applicable), and others.

Every company involved in the gas industry must deal with the issues associated with and cost of LAUF. This is true for production, gathering, midstream, pipeline, and distribution companies which are all impacted by and must account for LAUF gas loss. Traditionally, the cost and impact of LUAF is passed directly to the customer. More recently, gas industry companies have taken steps to manage the impact of LUAF on their customers.

Federal Energy Regulatory Commission Order 636 (promulgated in 1993) required pipeline companies to manage LAUF. Additionally, the price of natural gas and other fossil fuels experiences significant volatility. In combination, these factors, and others, underscore the need for natural gas energy companies to increasingly mitigate the effects of LAUF, regardless of where they fall on the energy value chain: production, gathering, processing plant, pipeline, and/or local distribution segment.

Metering devices and related errors account for a significant portion of LAUF. Such errors alone have likely resulted in hundreds of millions of dollars in losses in North America alone and losses similar in scope exist worldwide. Such losses have increased over time and are expected to continue to increase.

Metering devices with moving parts (e.g., turbine meters, rotary meters, and pressure regulators) are some of the items that are most impacted by aging and wear and tear.

Accordingly, a cost effective early warning system that provides an alert of an upcoming device failure would provide added value to energy companies. Given the extraordinary costs associated with faulty gas delivery monitoring equipment, methods and systems for identifying and reducing malfunctioning monitoring equipment is needed.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a monitoring system.

It is another aspect of the disclosed embodiments to provide a gas distribution monitoring system.

It is another aspect of the disclosed embodiments to provide an electronic volume corrector.

It is yet another aspect of the disclosed embodiments to provide an enhanced cloud connected electronic volume corrector for monitoring performance of associated gas distribution equipment.

The aforementioned aspects and other objectives and advantages can now be achieved as described herein. In embodiments disclosed herein, a system, method, and apparatus for distributed error detection in gas distribution systems comprise sensors coupled to a metering device, and configured to collect sensor information indicative of an operation of the metering device. An electronic volume corrector associated with the metering device serves as a gateway for transmission of sensor information indicative of the operation of the metering device. A computer system is configured to receive sensor information indicative of an operation of the metering device provided by electronic volume corrector, identify parameters indicative of deviations from the intended operation of the metering device, perform pattern comparisons of the sensor information with reference information, and provide a performance indication of the metering device.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
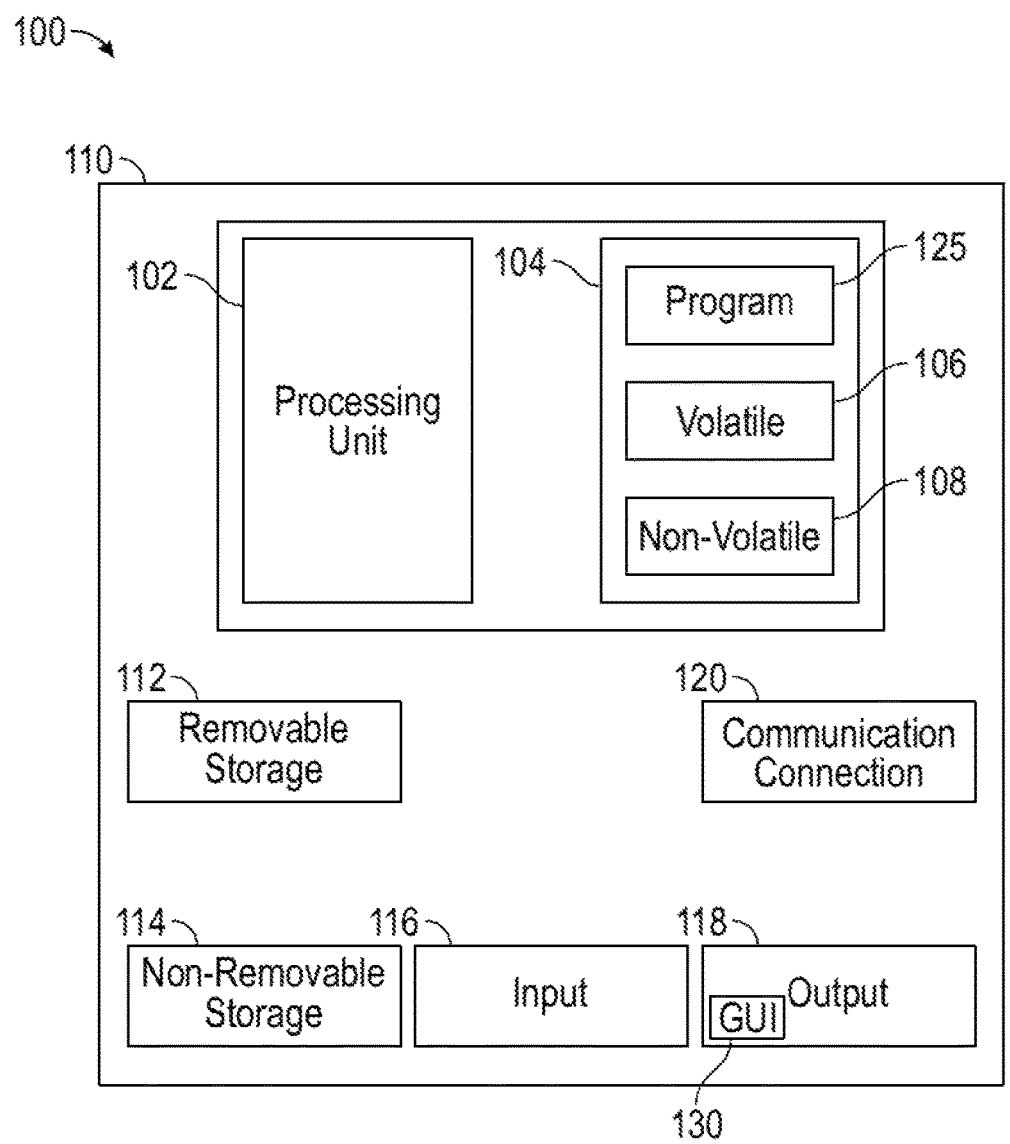
FIG. 1 depicts a block diagram of a computer system which is implemented in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or" as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending, at least in part upon context, may be used to describe any feature, structure, or characteristic in a singular sense or may be used to describe combinations of features, structures, or characteristics in a plural sense. In addition, the term "based on" may be understood as not necessarily intended to convey an exclusive set of factors and may, instead, allow for existence of additional factors not necessarily expressly described, again, depending at least in part on context.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
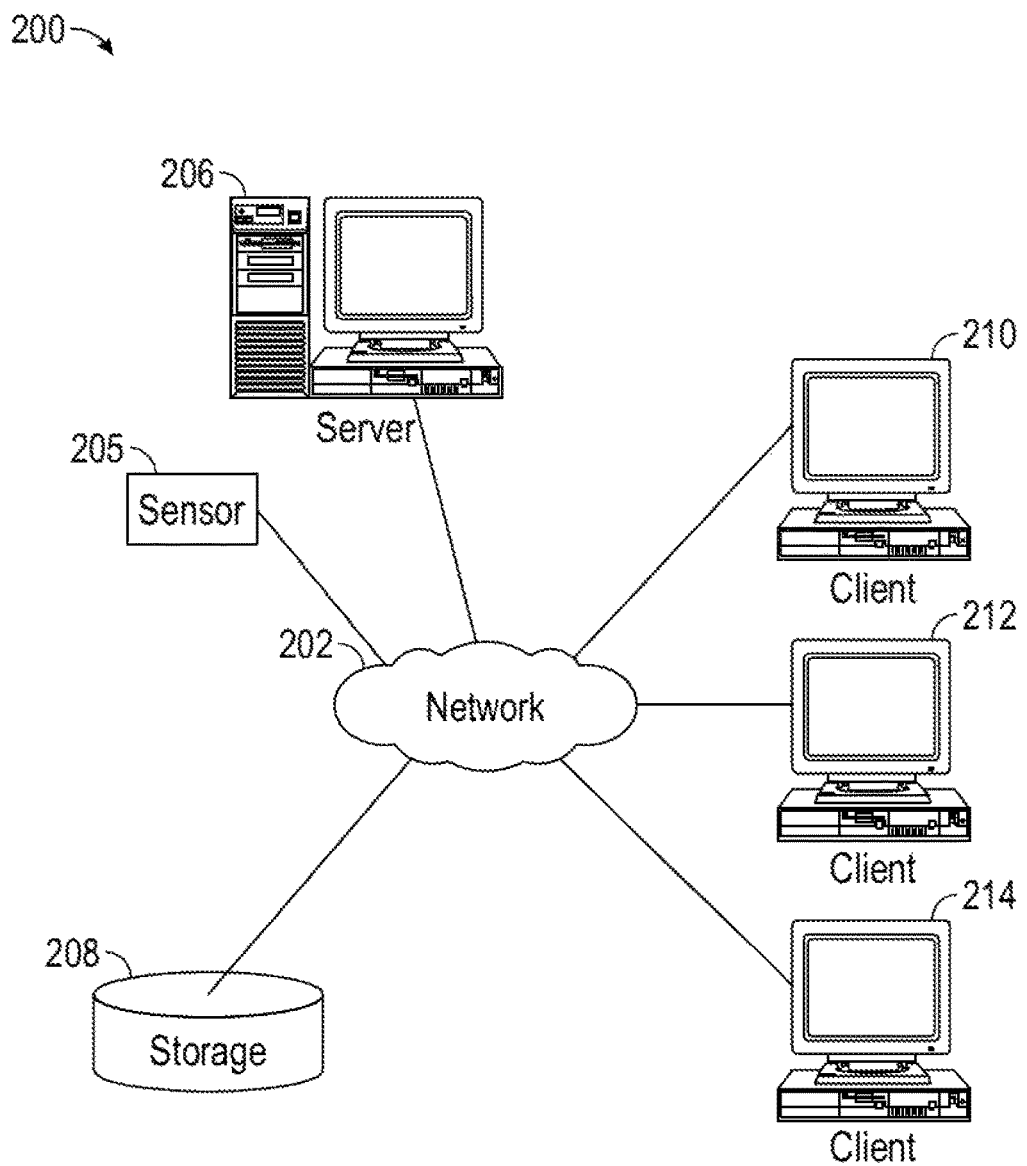
FIG. 2 depicts a graphical representation of a network of data-processing devices in which aspects of the present embodiments may be implemented.
Figure 3:
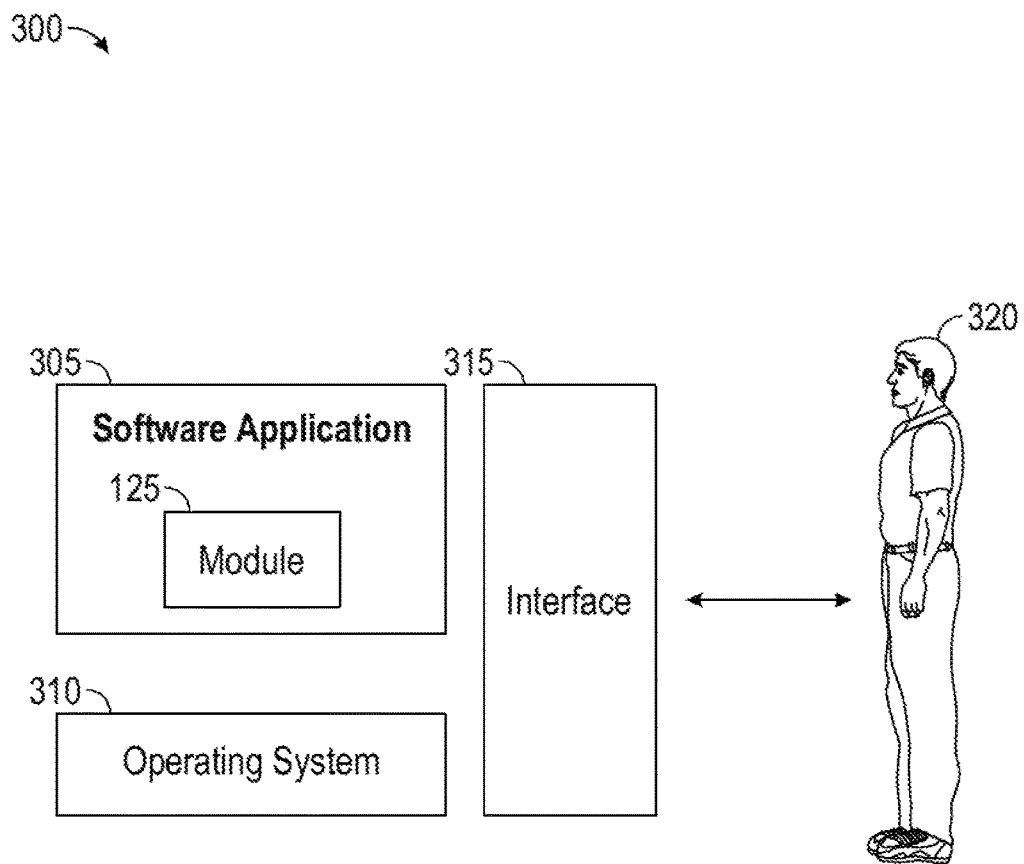
FIG. 3 depicts a computer software system for directing the operation of the data-processing system depicted in FIG. 1, in accordance with an example embodiment.

FIGS. 1-3 are provided as exemplary diagrams of data-processing environments in which embodiments may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a sensor, photographic camera, video camera, tracking device, or the like. The communication connection may include a Local Area Network (LAN), a Wide Area Network (WAN), or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present embodiments may be implemented. Network data-processing system 200 is a network of computers in which embodiments may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as a sensor 205 (for example, an electronic volume corrector, a pressure sensor, a temperature sensor, etc.) and a memory storage unit such as, for example, memory or database 208.

In the depicted example, sensor 205 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively clients 210, 212, and 214 may also be, for example, a photographic camera, video camera, tracking device, sensor, etc.

Computer system 100 can also be implemented as a server such as server 206, depending upon design consideration&. In the depicted example, server 206 provides data such as boot files, operating system images, applications, and application updates to clients 210, 212, and 214, and/or to sensor 205. Clients 210, 212, and 214 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments.

FIG. 3 illustrates a computer software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The methods and systems disclosed herein provide a predictive maintenance solution for gas metering devices used in, for example, the gas distribution industry. There are a large number of aging gas meters (e.g., turbine/rotary type) still in use in the field. The methods and system disclosed herein take advantage of connected electronic volume correctors (EVCs) as a gateway to collect and evaluate diagnostic information from these meters. The methods and systems thus provide value added services by making use of large connected-EVC installed systems.

EVCs are instruments that incorporate multiple devices that are used to calculate the corrected volume of gas being provided via gas distribution infrastructure. EVCs can be configured for either remote mounting or instrument mounted applications. In the case of a remote mount, a turbine or rotary meter is configured with a transmitter that sends an electronic signal to the EVC that indicates the volume of gas the meter has measured. The EVC uses that information to calculate a corrected volume.

In the case of instrument mounted applications, the EVC can be mounted directly to the turbine or rotary meter with a mechanical instrument drive. The EVC can receive an electrical signal that represents the volume of gas that the meter measured. Using that information, the EVC, again, corrects the measured volume. In either case, the EVC is generally configured to log and store the resulting data in memory for record keeping and distribution. As such, EVCs can include basic data processing equipment, memory, and networking capability as illustrated in FIGS. 1, 2, and 3 above.

In an embodiment, sensors associated with one or more EVCs provide data that can be used to directly and/or indirectly detect problems with a meter. Such data may be indicative of increased bearing friction, broken shafts, debris in the blades, and other such problems associated with a turbine meter and/or impeller wear and tear for a rotary meter. The data collected at the EVC gateway is then sent to a cloud or other computing device where diagnostics can be performed. Such diagnostics can be used to generate value added insights with respect to the health of the gas meter. Those insights can be provided to a user such as a utility owner. The key to the embodiments disclosed herein is the use of existing, communication enabled electronic volume correctors already in the field as a gateway to gather the data indicative of patterns and faults in the distribution equipment.

Figure 4:
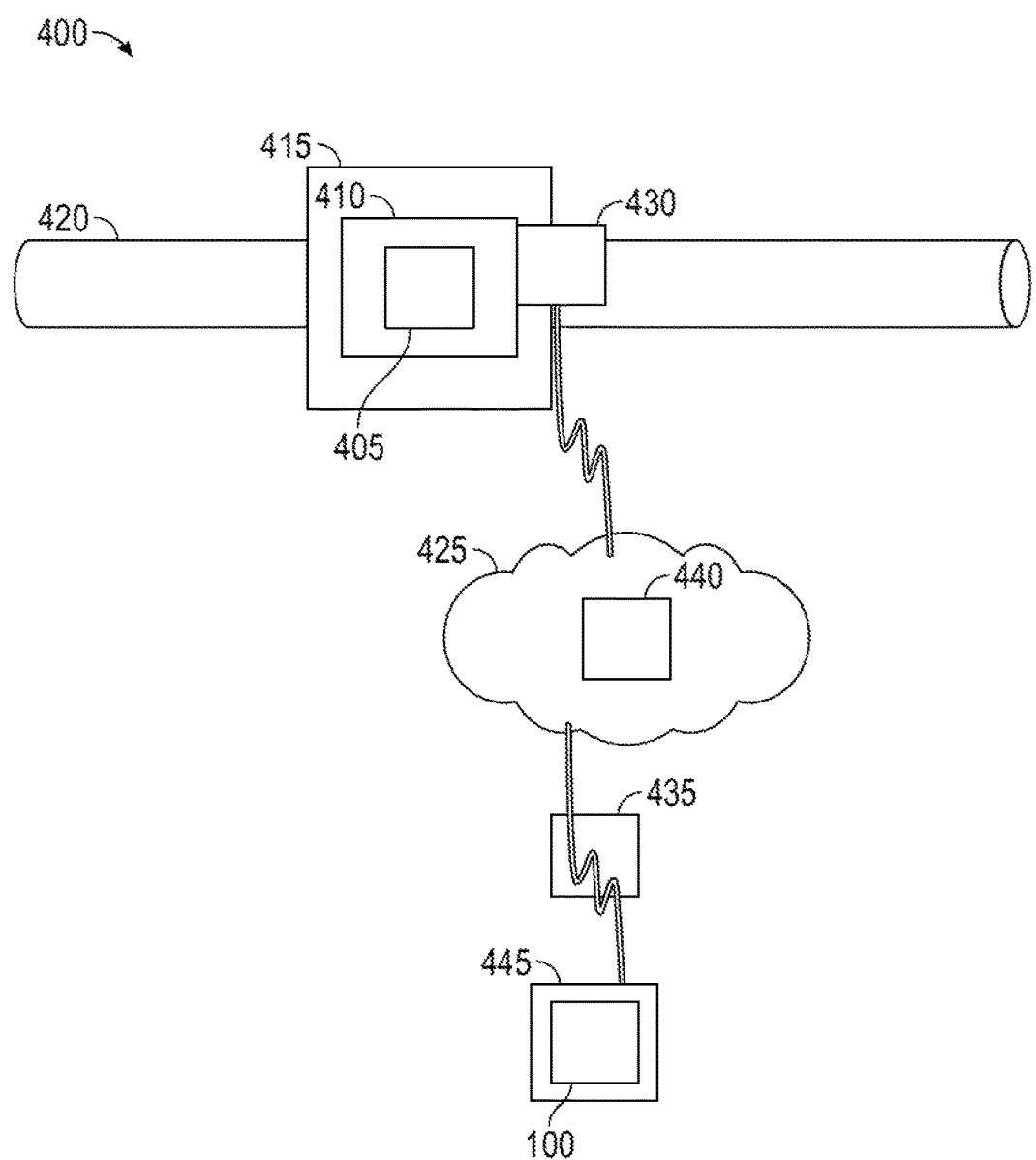
FIG. 4 depicts a block diagram of an error detection system for gas distribution and metering applications in accordance with the disclosed embodiments.

In an embodiment shown in FIG. 4, a system 400 for electronic volume correction with cloud based health monitoring of gas distribution equipment is illustrated. A sensor kit, or multiple sensor kits 405, can be installed on one or more electronic volume correctors 410. The sensor kits 405 collect information about and/or from a gas meter 415. Gas meter 415 can be embodied as a primary meter (or other such metering device) installed along a gas distribution system 420. The sensor kit 405 can also collect regular data including, but not limited to, pressure, temperature, and volume measurements.

The sensors associated with the sensor kit 405 can include vibration sensors, pipeline stress sensors, acoustics sensors, leak sensors, and other such sensors. It should be understood that other sensors may additionally be used in other embodiments according to the requirements of the specific electronic volume corrector 410, metering device 415, and pipeline infrastructure 420.

Information collected at the electronic volume corrector is cleaned and processed by the sensor kit 405. The processed data collected at the sensor kit 405 is then sent to a centralized cloud 425 (or other computing device). In some embodiments, the existing communication equipment 430 (in most cases a cellular modem) attached to the EVC Gateway can be used to transmit the processed data. In some embodiments, the data can be transmitted on demand. In other embodiments, the data can be transmitted at prescheduled intervals.

The centralized cloud 425 represents a type computing (including internet-based computing, local cloud computing, etc.) that facilitates cooperative allocation of computer processing resources and data to a networked group of computers and other devices. Cloud computing offers a configurable computing environment where resources such as servers, services, applications, networks, storage, and processing are shared. Data processing via cloud computing may take advantage of public or private networks dispersed throughout the world. This improves provisioning capabilities and allows simple scalability for applications, such as diagnostics associated with gas distribution infrastructure as disclosed herein, at widely dispersed locations.

The centralized cloud 425 can include a data analytics engine 440 that is specifically designed to detect deviations from the expected patterns of sensor values. For example, in one specific embodiment, in the case of the rotary meter, a gradual increase in pressure drop across the meter and increase in vibration levels can be indicative of wear and tear on rotary parts. This analysis can include, but is not limited to, waveform analysis, time-frequency analysis and order analysis with Faster Fourier Transforms (FFT), spectral analysis, and time synchronous averaging. The data analytics engine 440 can identify the gradual increase in pressure drop and an associated increase in vibration. The data analytics engine 440 can further determine that these are indicative of wear on parts of the rotary meter. The data analytics engine 440 can generate an early warning alarm to indicate that some performance indicator has been identified and is indicative of a meter component that requires attention and/or that calibration may be necessary. The data analytics engine 440 can further determine the deviations and potential monetary loss that should be expected as a result of the deviation.

An early warning alarm 435 can be triggered if the determined deviations warrant responsive action. The alarm 435 can include information indicating the determined deviations and monetary loss. The alarm 435 can be transmitted from the centralized cloud to a user device such as a computer, mobile device, tablet device, or the like as a notification in a mobile app 445 or similar application. The mobile app 445 can be used to view additional information about the deviation and meter in focus's maintenance and calibration history.

Figure 5:
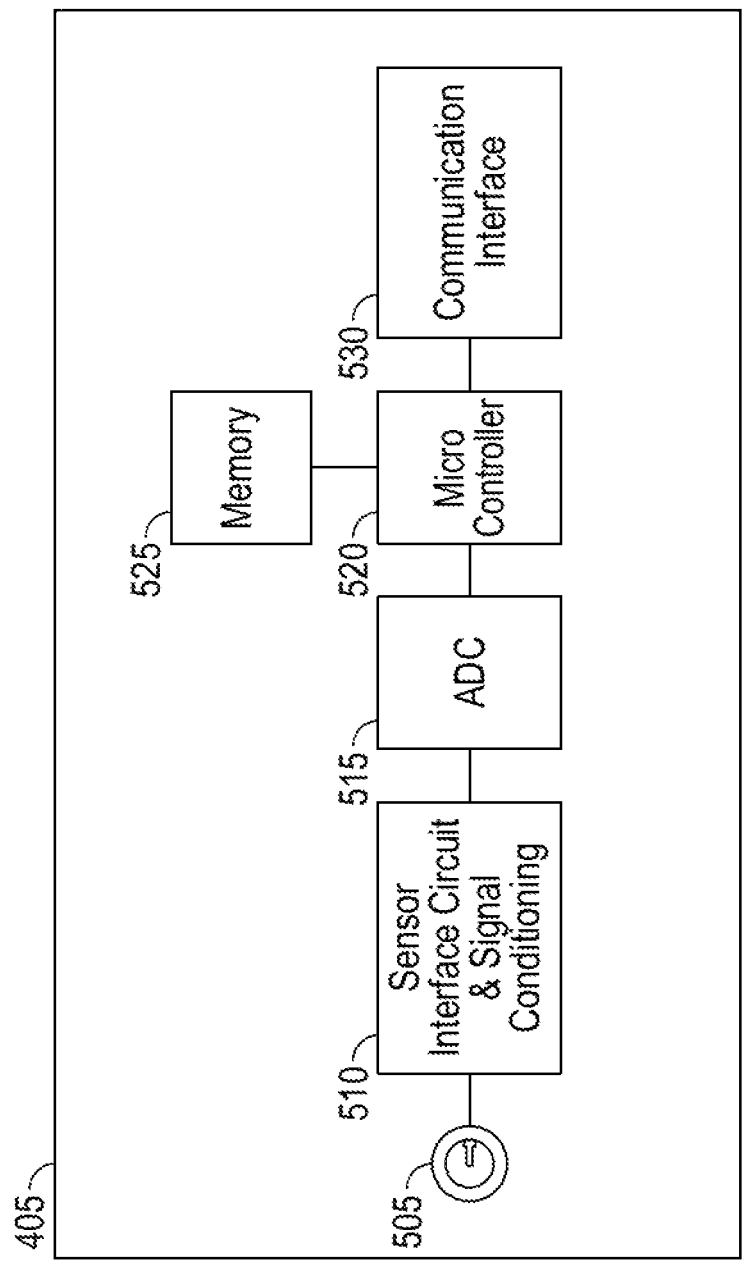
FIG. 5 depicts a sensor kit in accordance with the disclosed embodiments.

FIG. 5 illustrates an exemplary embodiment of a sensor kit 405. The sensor kit 405 can include a sensor 505. Sensor 505 can be embodied as any number of sensors including, but not limited to, sensors capable of measuring vibration, strain, temperature, pressure, acoustical signals, leakage, voltage, power, resistance, current, conductivity, permittivity, capacitance, resistance, permeability, pipeline stress, etc. These sensors can further be used to identify wear and tear on equipment, improper assembly, tampering, leaking, aging of the equipment, and loading. The sensor 505 is thus generally configured to measure a physical characteristic associated with the metering device or distribution infrastructure.

The sensor converts the physical characteristic into an analog signal that is provided to a sensor interface circuit and signal conditioning module 510. The sensor interface circuit and signal conditioning module 510 takes the input analog signal and conditions the signal for further processing. An analog to digital converter (ADC) 515 converts the analog signal to a digital signal. An ADC 515 can be embodied by any one of many known ADC architectures according to the specific application of sensor kit 405.

The digital signal from the ADC 515 can then be sent to a micro controller 520 and/or an on-board memory device 525. The micro controller can be programmed to perform various data analytics on the digital signal, the results of which can then be stored in memory 525. The raw digital signal data can also be stored in memory 525. Finally, a communications interface 530 can be provided on sensor kit 405. The communications interface provides a means for transmitting the collected and/or processed data to an external device such as an EVC 410, a cloud 425, or a computing device. The communications interface can be embodied as a wired or wireless modem, transceiver, Bluetooth device, BLE device, or other similar communications module.

Figure 6:
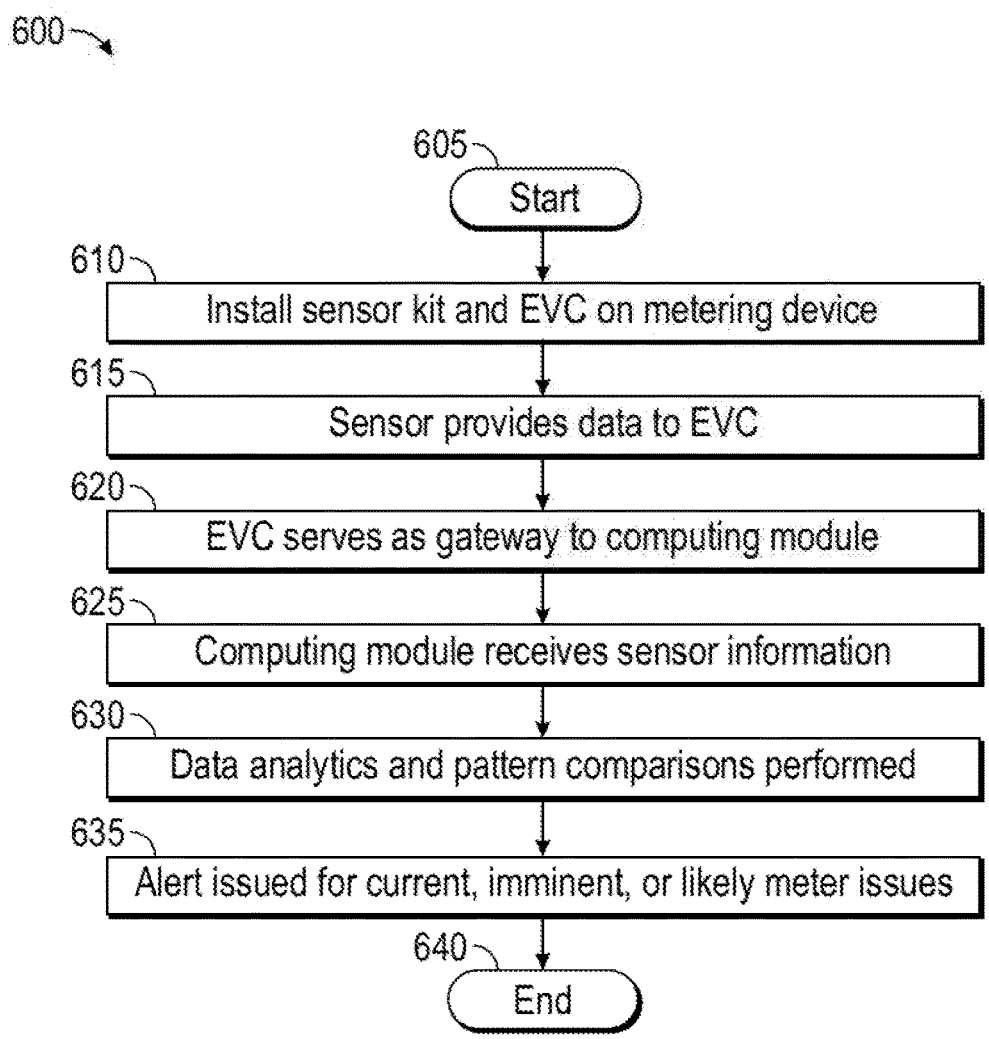
FIG. 6 depicts flow chart illustrating steps of a method for error detection in gas distribution and metering applications in accordance with disclosed embodiments.

FIG. 6 illustrates a method 600 for identifying maintenance issues in a metering device in accordance with the disclosed embodiments. The method begins at step 605. At step 610, a metering device can be equipped with a sensor kit and an EVC. In an embodiment, the sensor kit can include one or more sensors adapted to measure one or more characteristics of the metering device. The sensor kit can condition the raw signal from the metering device and then provide the conditioned to the EVC at step 615. The EVC is configured to calculate a corrected volume measured by the metering device.

At step 620, the EVC can serve as a gateway to transmit both raw data collected by the sensor as well as processed data, to a computing module, which can be embodied as a cloud computing module, computer, mobile device, or other such processing device.

The computing module is configured to receive the sensor information as shown at step 625. In an exemplary embodiment, the sensor information can be sent via wired or wireless communication infrastructure. The computing module can then perform data analytics and pattern comparisons in order to identify current, imminent, or likely future meter maintenance issues as shown at step 630.

The computer module can issue an alert indicating current, imminent, or likely future meter maintenance issues as shown at step 635. In certain embodiments, the alert can be provided via user computer, mobile device, tablet device, or other such device. The alert can include instructions to halt or modify meter operations, maintenance suggestions, data logs of sensor information, likely events and remedies, root causes of malfunctions, and patterns in the sensor information. The method then ends at step 640.

Figure 7:
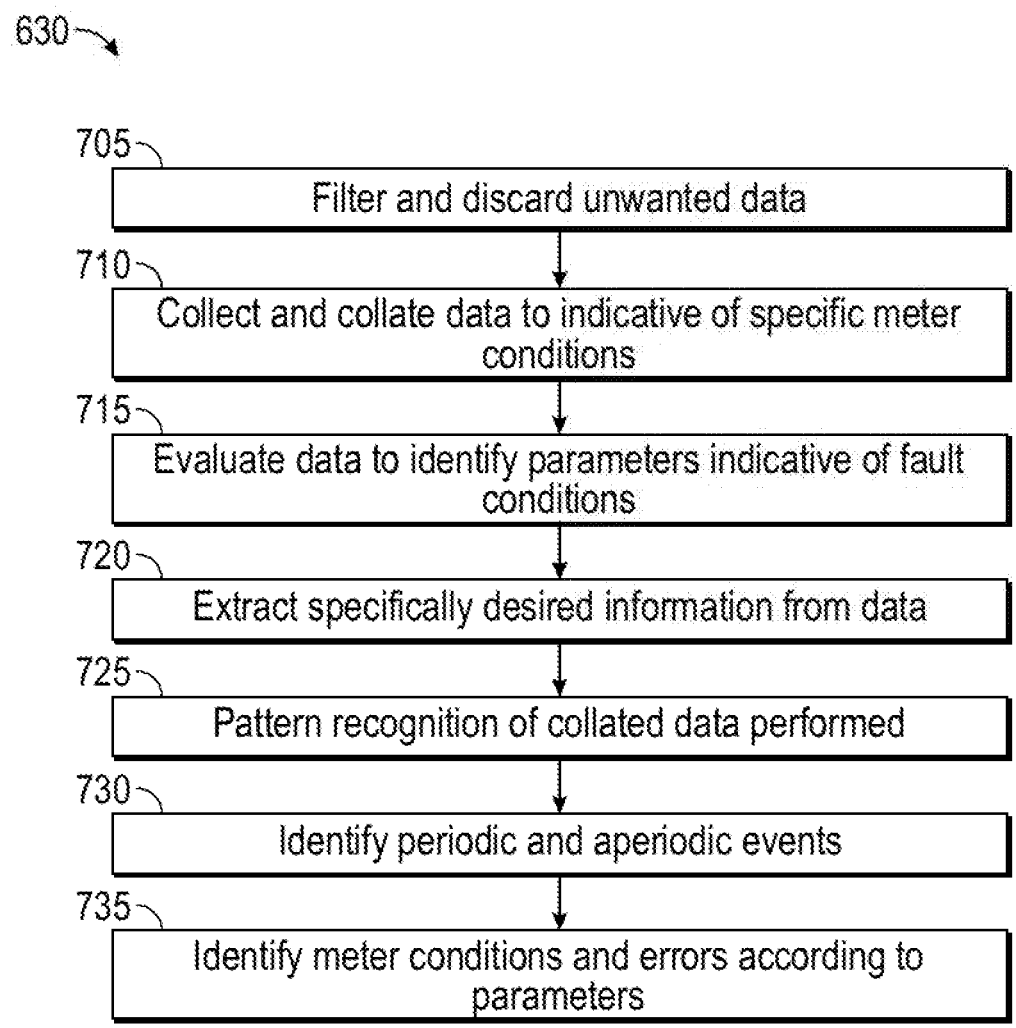
FIG. 7 depicts a flow chart illustrating steps of a method for analyzing and comparing data associated with error detection in gas distribution and metering applications in accordance with the disclosed embodiments.

FIG. 7 provides more detailed steps associated with method step 630, wherein data analytics and pattern recognition analysis is performed. Upon receiving the conditioned data from the EVC, the computer module can perform data analytics to derive meaningful information out of collected information and can perform pattern comparison of collected sensor information or results of such analytics with pre-stored reference information. The process starts by filtering and discarding unwanted data as illustrated at step 705. Step 705 can include removing any data not useful for identifying fault conditions, removing noisy or incomplete data, removing corrupted or otherwise unusable data, etc.

Next at step 710, the relevant data can be collected and collated into data that is indicative of specific meter conditions. In certain embodiments, the data collected can be indicative of physical parameters measured at the metering device, including vibration, temperature, parameters of electrical signals such as voltage, power, resistance, current, capacitance, material properties including conductivity, permeability, or other properties. At step 715, the collected and collated data can be evaluated to identify parameters that are used to identify meter conditions including calibration settings, wear and tear on the meter, improper assembly, tampering, aging of the equipment, loading or other such defects that influence the operation of the metering device and/or distribution infrastructure.

At step 720, the specifically desired information for a given application can be extracted. This can include specific parameters indicative of one or more meter conditions of interest in the application. For example, for a rotary meter, gradual increase in pressure drop across the meter and increase in vibration levels indicate a wear and tear of rotary parts.

In addition, at step 630 machine learning can be employed to perform pattern recognition on the collected and collated data. This can include comparing the collected data to pre-stored pattern data. The pre-stored pattern data can be adjusted using the collected data and machine learning techniques to indicate various fault conditions. The collected and collated data can be compared against the pre-stored data to identify patterns that therefore indicate current, imminent, or likely future faults at the metering device. Such patterns may become evident by identifying periodic and aperiodic events as shown at step 730. In other embodiments, pattern recognition techniques can be performed on historical data and current data collected from a metering device.

The analytics and pattern recognition can thus take advantage of the collected and collated data, and associated parameters to identify current meter function, and to predict future meter function and/or errors as shown at step 735.

In other embodiments, thresholding can be used to identify meter conditions. For example, preset thresholds can be established and stored. The collected parameters can then be compared to such thresholds. In certain cases if a given parameter exceeds its associate threshold value, a current, imminent, or future fault condition can be identified. Alternatively, the system can uses multiple thresholds in combination to identify certain meter conditions. The thresholds can be determined via user assignment or can be developed via machine learning techniques.

It should be appreciated that, in other embodiments, data analytics methodologies can be used by or sent to the EVC by the cloud or remote computation device. In such embodiments, the EVC may be configured to alter or adjust the function of the sensor kit or metering device.

In still other embodiments, the EVC may also be capable of standalone operations wherein the analytics and pattern matching performed at step 630 can be provided by the EVC. In some cases, the EVC may have limited capabilities to perform the data analysis and/or reporting. The EVC may, for example, indicate the outcome to end used through built in input output devices such as displays included thereon. The EVC can also be equipped with onboard storage for storing data logs and analysis results.

In an embodiment, the necessary configuration and software upgrades of sensors or sensor systems can be done by the remote computation device through the gateway provided by the EVC or directly EVC in standalone mode. Such configurations and software upgrades can be provided to correct metering errors or in the course of normal maintenance.

In certain embodiments, the alerts issued to the user can include reported events and suggested remedies associated with the health, calibration, and current status of the distribution architecture and/or metering device.

The preventive maintenance systems and methods disclosed herein can be extended to other equipment in a gas distribution network including, but not limited to, pressure regulators, valves, etc. In certain embodiments, a Bluetooth, Bluetooth Low Energy (BLE) mesh, and/or ZigBee mesh can be configured to transmit data as disclosed herein between a cloud, sensors, an EVC, a user device, and the equipment in the gas distribution network.

Accordingly, the methods and systems disclosed herein are directed to a gas distribution monitoring system that leverages an electronic volume corrector with means of connecting to remote computation systems. The EVC can interface with a plurality of sensors or sensor systems coupled to associated devices such as gas metering and distribution devices. The sensors can collect physical parameters which are indicative of deviations from intended operation of the associated metering devices over certain time intervals and with certain fidelity.

Data analytics can be used to derive meaningful information from the collected data and pattern comparisons of the collected sensor information can be used to determine the health of the distribution and metering systems.

In the embodiments disclosed herein, the distribution infrastructure and metering devices can include primary gas meters, turbine meters, rotary meters, gas pressure regulators, and the like.

The sensors can be used to identify physical parameters such as vibration, temperature, one or more parameters associated with electrical signals, material properties like conductivity, etc. The parameters may be of device calibration, device wear and tear, improper assembly, tampering, aging of the equipment, loading or other such defects that influence device functionality. The sensors or sensor systems are coupled to the EVC to exchange one or more raw signals or processed data.

In the embodiments disclosed herein, the data analytics include, but are not limited to, filtering of unwanted data, collecting and collating data indicative of similar device function, quantitative comparison of data patterns between multiple devices, or with pre-defined patterns, and application of mathematical algorithms to extract other specific information of interest. Thresholding and data analytics can be used by the EVCs or by the remote computation device. Further, data analytics can be performed at the computation device based on analyzed or raw sensor data gathered from at least one EVC.

Analysis of the collected data can separate out periodic events as well as aperiodic events. The embodiments further support processing to statistically conclude the root cause of one or more events leading to the patterns in the collected signal or data and provide notifications of meaningful events, and/or to provide alarms to the end users in the case where urgent action is necessary. The reported events and the remedies can be indicative of the health, calibration and maintenance of the field distribution infrastructure and metering devices. The notification of events and alarms can be provided with recommendations for rectifying the root cause of the alarm or event.

The EVC is also capable of standalone operations. The EVC can included hardware and machine instructions to perform data analysis and reporting to end user via built in input output devices such as displays. The EVC can also be configured to store data logs and outcome of analysis in its own machine readable memory.

In certain embodiments, multiple EVCs (including one or more pre-designated EVC) can perform data analysis and can communicate results to a remote mobile device. Necessary configuration and software upgrades to sensors or sensor systems can be sent by the remote device through the EVC gateway to the sensor kits or directly to the EVC in a standalone mode.

The embodiments disclosed herein offer an extremely cost effective solution to distribute error checking and maintenance of metering systems. In addition, the systems and methods provide diagnostic capabilities for existing installations without any required disruptions in the system or additional certifications for installation.

Based on the foregoing, it can be appreciated that a number of embodiments, preferred and alternative, are disclosed herein. For example, in one embodiment, a system comprises at least one sensor coupled to at least one device associated with a gas distribution network, the at least one sensor being configured to collect sensor information indicative of an operation of the at least one device associated with a gas distribution network, an electronic volume corrector associated with the at least one device associated with a gas distribution network wherein the electronic volume corrector receives the sensor information indicative of an operation of the at least one device associated with a gas distribution network, and a computer system comprising at least one processor and a storage device communicatively coupled to the at least one processor, the storage device storing instructions which, when executed by the at least one processor, cause the at least one processor to perform operations comprising: receiving the sensor information indicative of an operation of the at least one device associated with a gas distribution network provided by electronic volume corrector; identifying at least one parameter indicative of a deviation from an intended operation of the at least one device associated with a gas distribution network; performing a pattern comparison of the sensor information with reference information; and providing a performance indication of the at least one device associated with a gas distribution network according to the at least one parameter indicative of a deviation from an intended operation of the at least one device associated with a gas distribution network and the pattern comparison for presentation through a user interface.

In an embodiment, the at least one device associated with a gas distribution network comprises at least one of, but is not limited to, a metering device, a pressure regulator, a control or safety valve, etc.

In an embodiment, the at least one parameter comprises at least one of vibration, temperature, pressure, voltage, power, resistance, current, conductivity, permittivity, capacitance, resistance, permeability, wear and tear, improper assembly, tampering, aging of the equipment, and loading.

In an embodiment, the system further comprises a wireless mesh wherein receiving the sensor information indicative of an operation of the at least one device associated with a gas distribution network provided by electronic volume corrector further comprises transmitting the sensor information via the wireless mesh In an embodiment, the at least one sensor is coupled to the electronic volume corrector via at least one of a wired communication connection and a wireless communication connection.

In an embodiment, identifying at least one parameter indicative of a deviation from an intended operation of the at least one device associated with a gas distribution network further comprises filtering unwanted sensor information, extracting sensor information indicative of similar instances, collating the sensor information indicative of similar instances, and quantitatively comparing sensor information patterns.

In an embodiment, identifying at least one parameter indicative of a deviation from an intended operation of the at least one device associated with a gas distribution network further comprises identifying periodic events in the sensor information and identifying aperiodic events in the sensor information.

In an embodiment, the system further comprises determining a root cause of an error associated with the at least one device associated with a gas distribution network according to the at least one parameter indicative of a deviation from an intended operation of the at least one device associated with a gas distribution network and the pattern comparison and providing a recommendation for rectifying the root cause of the error associated with the at least one device associated with a gas distribution network.

In an embodiment, the electronic volume corrector comprises at least one processor and a storage device communicatively coupled to the at least one processor, the storage device storing instructions which, when executed by the at least one processor, cause the at least one processor to perform operations comprising: receiving the sensor information indicative of an operation of the at least one device associated with a gas distribution network provided by the electronic volume corrector; identifying at least one parameter indicative of a deviation from an intended operation of the at least one device associated with a gas distribution network; performing a pattern comparison of the sensor information with reference information; and providing a performance indication of the at least one device associated with a gas distribution network according to the at least one parameter indicative of a deviation from an intended operation of the at least one device associated with a gas distribution network and the pattern comparison for presentation through a user interface.

In an embodiment, the EVC is configured to store at least one of data logs and the performance indications.

In another embodiment, a gas distribution monitoring apparatus comprises at least one sensor coupled to at least one device associated with a gas distribution network, the at least one sensor being configured to collect sensor information indicative of an operation of the at least one device associated with a gas distribution network, an electronic volume corrector associated with the at least one device associated with a gas distribution network wherein the electronic volume corrector receives the sensor information indicative of an operation of the at least one device associated with a gas distribution network, and a computer system comprising at least one processor and a storage device communicatively coupled to the at least one processor, the storage device storing instructions which, when executed by the at least one processor, cause the at least one processor to perform operations comprising: receiving the sensor information indicative of an operation of the at least one device associated with a gas distribution network provided by electronic volume corrector; filtering unwanted sensor information; extracting sensor information indicative of similar instances; collating the sensor information indicative of similar instances; quantitatively comparing sensor information patterns; performing a pattern comparison of the sensor information with reference information; and providing a performance indication of the at least one device associated with a gas distribution network according to the at least one parameter indicative of a deviation from an intended operation of the at least one device associated with a gas distribution network and the pattern comparison for presentation through a user interface.

In an embodiment of the apparatus, identifying at least one parameter indicative of a deviation from an intended operation of the at least one device associated with a gas distribution network further comprises identifying periodic events in the sensor information; and identifying aperiodic events in the sensor information.

In an embodiment the apparatus, further comprises determining a root cause of an error associated with the at least one device associated with a gas distribution network according to the at least one parameter indicative of a deviation from an intended operation of the at least one device associated with a gas distribution network and the pattern comparison and providing a recommendation for rectifying the root cause of the error associated with the at least one device associated with a gas distribution network.

In an embodiment of the apparatus, the electronic volume corrector comprises at least one processor and a storage device communicatively coupled to the at least one processor, the storage device storing instructions which, when executed by the at least one processor, cause the at least one processor to perform operations comprising: receiving the sensor information indicative of an operation of the at least one device associated with a gas distribution network provided by electronic volume corrector; identifying at least one parameter indicative of a deviation from an intended operation of the at least one device associated with a gas distribution network; performing a pattern comparison of the sensor information with reference information; providing a performance indication of the at least one device associated with a gas distribution network according to the at least one parameter indicative of a deviation from an intended operation of the at least one device associated with a gas distribution network, and the pattern comparison for presentation through a user interface. In an embodiment, the EVC is configured to store at least one of data logs and the performance indications.

In another embodiment, a gas distribution monitoring method comprises coupling at least one sensor to at least one device associated with a gas distribution network, collecting sensor information indicative of an operation of the at least one device associated with a gas distribution network, providing the sensor information indicative of an operation of the at least one device associated with a gas distribution network to an electronic volume corrector, receiving the sensor information indicative of an operation of the at least one device associated with a gas distribution network provided by electronic volume corrector at a cloud computer system, identifying at least one parameter indicative of a deviation from an intended operation of the at least one device associated with a gas distribution network, performing a pattern comparison of the sensor information with reference information, providing a performance indication of the at least one device associated with a gas distribution network according to the at least one parameter indicative of a deviation from an intended operation of the at least one device associated with a gas distribution network, and the pattern comparison for presentation through a user interface.

In an embodiment of the method, identifying at least one parameter indicative of a deviation from an intended operation of the at least one device associated with a gas distribution network further comprises filtering unwanted sensor information, extracting sensor information indicative of similar instances, collating the sensor information indicative of similar instances, and quantitatively comparing sensor information patterns.

In an embodiment of the method, identifying at least one parameter indicative of a deviation from an intended operation of the at least one device associated with a gas distribution network further comprises identifying periodic events in the sensor information, and identifying aperiodic events in the sensor information.

In another embodiment, the method further comprises determining a root cause of an error associated with the at least one device associated with a gas distribution network according to the at least one parameter indicative of a deviation from an intended operation of the at least one device associated with a gas distribution network and the pattern comparison and providing a recommendation for rectifying the root cause of the error associated with the at least one device associated with a gas distribution network.

In another embodiment of the method, the at least one device associated with a gas distribution network comprises at least one of a metering device, a pressure regulator, and a control/safety valve.

It will be appreciated that variations of the above-disclosed and other features and functions, or alternatives thereof, may be desirably combined into many other different systems or applications. Also, it will be appreciated that various presently unforeseen or unanticipated alternatives, modifications, variations or improvements therein may be subsequently made by those skilled in the art which are also intended to be encompassed by the following claims.

What is claimed is:

1. A system comprising:
   at least one sensor coupled to at least one device associated with a gas distribution network, said at least one sensor being configured to collect sensor information indicative of an operation of said at least one device associated with a gas distribution network;
   an electronic volume corrector associated with said at least one device associated with a gas distribution network wherein said electronic volume corrector receives said sensor information indicative of an operation of said at least one device associated with a gas distribution network; and
   a computer system comprising at least one processor and a storage device communicatively coupled to the at least one processor, the storage device storing instructions which, when executed by the at least one processor, cause the at least one processor to perform operations comprising:
      receiving said sensor information indicative of an operation of said at least one device associated with a gas distribution network provided by electronic volume corrector;
      identifying at least one parameter indicative of a deviation from an intended operation of said at least one device associated with a gas distribution network;
      performing a pattern comparison of said sensor information with reference information; and
      providing a performance indication of said at least one device associated with a gas distribution network according to said at least one parameter indicative of a deviation from an intended operation of said at least one device associated with a gas distribution network and said pattern comparison for presentation through a user interface.

2. The system of claim 1 wherein said at least one device associated with a gas distribution network comprises at least one of:
   a metering device;
   a pressure regulator; and
   a control/safety valve.

3. The system of claim 1 further comprising:
   a wireless mesh wherein receiving said sensor information indicative of an operation of said at least one device associated with a gas distribution network provided by an electronic volume corrector further comprises transmitting said sensor information via said wireless mesh.

4. The system of claim 1 wherein said at least one sensor is coupled to said electronic volume corrector via at least one of a wired communication connection and a wireless communication connection.

5. The system of claim 1 wherein identifying at least one parameter indicative of a deviation from an intended operation of said at least one device associated with a gas distribution network further comprises:
   filtering unwanted sensor information;
   extracting sensor information indicative of similar instances;
   collating said sensor information indicative of similar instances; and
   quantitatively comparing sensor information patterns.

6. The system of claim 1 wherein identifying at least one parameter indicative of a deviation from an intended operation of said at least one device associated with a gas distribution network further comprises:
   identifying periodic events in said sensor information; and
   identifying aperiodic events in said sensor information.

7. The system of claim 1 further comprising:
   determining a root cause of an error associated with said at least one device associated with a gas distribution network according to said at least one parameter indicative of a deviation from an intended operation of said at least one device associated with a gas distribution network and said pattern comparison.

8. The system of claim 7 further comprising:
   providing a recommendation for rectifying said root cause of said error associated with said at least one device associated with a gas distribution network.

9. The system of claim 1 wherein said electronic volume corrector comprises:
   at least one processor and a storage device communicatively coupled to the at least one processor, the storage device storing instructions which, when executed by the at least one processor, cause the at least one processor to perform operations comprising:
      receiving said sensor information indicative of an operation of said at least one device associated with a gas distribution network provided by said electronic volume corrector;
      identifying at least one parameter indicative of a deviation from an intended operation of said at least one device associated with a gas distribution network;
      performing a pattern comparison of said sensor information with reference information; and
      providing a performance indication of said at least one device associated with a gas distribution network according to said at least one parameter indicative of a deviation from an intended operation of said at least one device associated with a gas distribution network and said pattern comparison for presentation through a user interface.

10. The system of claim 9 wherein the EVC is configured to store at least one of:
    data logs; and
    said performance indications.

11. A gas distribution monitoring apparatus comprising:
    at least one sensor coupled to at least one device associated with a gas distribution network, said at least one sensor being configured to collect sensor information indicative of an operation of said at least one device associated with a gas distribution network;
    an electronic volume corrector associated with said at least one device associated with a gas distribution network wherein said electronic volume corrector receives said sensor information indicative of an operation of said at least one device associated with a gas distribution network; and
    a computer system comprising at least one processor and a storage device communicatively coupled to the at least one processor, the storage device storing instructions which, when executed by the at least one processor, cause the at least one processor to perform operations comprising:
       receiving said sensor information indicative of an operation of said at least one device associated with a gas distribution network provided by electronic volume corrector;
       filtering unwanted sensor information;
       extracting sensor information indicative of similar instances;

collating said sensor information indicative of similar instances;

quantitatively comparing sensor information patterns;

performing a pattern comparison of said sensor information with reference information; and providing a performance indication of said at least one device associated with a gas distribution network according to said at least one parameter indicative of a deviation from an intended operation of said at least one device associated with a gas distribution network and said pattern comparison for presentation through a user interface.

12. The apparatus of claim 11 wherein identifying at least one parameter indicative of a deviation from an intended operation of said at least one device associated with a gas distribution network further comprises:

identifying periodic events in said sensor information; and identifying aperiodic events in said sensor information.

13. The apparatus of claim 11 further comprising:

determining a root cause of an error associated with said at least one device associated with a gas distribution network according to said at least one parameter indicative of a deviation from an intended operation of said at least one device associated with a gas distribution network and said pattern comparison; and providing a recommendation for rectifying said root cause of said error associated with said at least one device associated with a gas distribution network.

14. The apparatus of claim 11 wherein said electronic volume corrector comprises:

at least one processor and a storage device communicatively coupled to the at least one processor, the storage device storing instructions which, when executed by the at least one processor, cause the at least one processor to perform operations comprising:

receiving said sensor information indicative of an operation of said at least one device associated with a gas distribution network provided by electronic volume corrector;

identifying at least one parameter indicative of a deviation from an intended operation of said at least one device associated with a gas distribution network;

performing a pattern comparison of said sensor information with reference information; and providing a performance indication of said at least one device associated with a gas distribution network according to said at least one parameter indicative of a deviation from an intended operation of said at least one device associated with a gas distribution network and said pattern comparison for presentation through a user interface.

15. The apparatus of claim 14 wherein the EVC is configured to store at least one of:

data logs; and said performance indications.

16. A gas distribution monitoring method, said method comprising:

coupling at least one sensor to at least one device associated with a gas distribution network;

collecting sensor information indicative of an operation of said at least one device associated with a gas distribution network;

providing said sensor information indicative of an operation of said at least one device associated with a gas distribution network to an electronic volume corrector;

receiving said sensor information indicative of an operation of said at least one device associated with a gas distribution network provided by an electronic volume corrector at a cloud computer system;

identifying at least one parameter indicative of a deviation from an intended operation of said at least one device associated with a gas distribution network;

performing a pattern comparison of said sensor information with reference information; and providing a performance indication of said at least one device associated with a gas distribution network according to said at least one parameter indicative of a deviation from an intended operation of said at least one device associated with a gas distribution network and said pattern comparison for presentation through a user interface.

17. The method of claim 16 wherein identifying at least one parameter indicative of a deviation from an intended operation of said at least one device associated with a gas distribution network further comprises:

filtering unwanted sensor information;

extracting sensor information indicative of similar instances;

collating said sensor information indicative of similar instances; and quantitatively comparing sensor information patterns.

18. The method of claim 16 wherein identifying at least one parameter indicative of a deviation from an intended operation of said at least one device associated with a gas distribution network further comprises:

identifying periodic events in said sensor information; and identifying aperiodic events in said sensor information.

19. The method of claim 16 further comprising:

determining a root cause of an error associated with said at least one device associated with a gas distribution network according to said at least one parameter indicative of a deviation from an intended operation of said at least one device associated with a gas distribution network and said pattern comparison; and providing a recommendation for rectifying said root cause of said error associated with said at least one device associated with a gas distribution network.

20. The method of claim 16 wherein said at least one device associated with a gas distribution network comprises at least one of:

a metering device;

a pressure regulator; and a control/safety valve.

* * * * *